United States Patent [19]

Trümpler et al.

[11] Patent Number: 4,729,087
[45] Date of Patent: Mar. 1, 1988

[54] INVERSION PROCESS AND APPARATUS

[75] Inventors: Walter Trümpler, Karlsruhe; Ottokar Zimmermann, Bruchsal, both of Fed. Rep. of Germany

[73] Assignee: Sew-Eurodrive GmbH & Co., Fed. Rep. of Germany

[21] Appl. No.: 841,235

[22] Filed: Mar. 19, 1986

[30] Foreign Application Priority Data

Apr. 16, 1985 [DE] Fed. Rep. of Germany ....... 3513584

[51] Int. Cl.$^4$ .............................................. H02M 5/42
[52] U.S. Cl. ......................................... 363/98; 363/37
[58] Field of Search ....................... 363/35, 37, 95, 97, 363/98, 125, 127, 128

[56] References Cited

U.S. PATENT DOCUMENTS 3,403,318  9/1968  Krauthamer et al. ................ 363/37
3,474,320 10/1969  Chandler .............................. 363/37
4,370,702  1/1983  Shuey et al. .......................... 363/98

Primary Examiner—Patrick R. Salce
Assistant Examiner—Anita M. Ault
Attorney, Agent, or Firm—Antonelli, Terry & Wands

[57] ABSTRACT

An inversion method, particularly as part of a frequency change is proposed, e.g. for regulating three-phase motors, square-wave voltage pulses being produced by opening and closing electronic switches, so that repeatedly and in a desired order predetermined combinations of switch positions and associated number of clock intervals of unchanged switch position are in each case requested, the switch position combination set and the corresponding number of clock intervals is counted without changing the switch position.

7 Claims, 4 Drawing Figures

INVERSION PROCESS AND APPARATUS

The invention relates to a frequency inversion process, particularly as part of a frequency change, e.g. for regulating three-phase motors, square-wave voltage pulses being produced by opening and closing electronic switches and also relates to a frequency inversion apparatus, particularly as part of a frequency changer, with a plurality of electronic switches by means of which voltages can be applied to a load, such a three-phase motors.

Various inversion processes are known, particularly for producing a three-phase rotary field. In the known processes, square-wave voltages are applied to the load and are switched in by means of electronic switches, such as transistors, the switches being switched in a given sequence. Thus, the desired sign-wave voltage pattern is approximated by square-wave voltages and an approximation by one square pulse per half-wave at high frequencies due to the masses and therefore the inertia of a load, such as a motor, can be acceptable with respect to the noise production and concentricity behaviour. However, this is not the case at low speeds, such as can e.g. occur on starting up. Therefore attempts have already been made to associate two equalizing pulses with one wide square-wave pulse per half-wave below a given frequency. However, this solution is not satisfactory, because it is inadequate at low speeds to achieve a good concentricity behaviour and low noise production in the motor.

SUMMARY OF THE INVENTION

The problem of the present invention is to provide a process making it possible, in a simple manner and without excessive technical expenditure, to achieve an optimum control of an inverter, particularly for regulating three-phase motors.

According to the invention this problem is solved in that repeatedly and in a desired sequence given combinations of switch positions and the associated number of clock intervals of unchanged switch position are in each case requested, the switch position combinations adjusted and the corresponding number of clock intervals is counted without changing the switch position. An inverter is characterized by an electronic memory, in which are stored on the one hand given combinations of switch positions and on the other the numbers of clock intervals associated therewith and belonging thereto and via which the corresponding switch position combinations are to be maintained, as well as a counter and a device for requesting switch position combinations and the number of associated clock intervals from the memory and for adjusting the combination of switches and setting the counter.

Thus, according to the invention the states of the three phases of e.g. a three-phase current are not stored and requested or polled for each clock generator time. This would call for a sophisticated and therefore sensitive microprocessor, which would be at risk in power electronics, such as power transistors as electronic switches in the inverter, so that failures would be likely. Moreover, such a processor would not have the necessary speed of operation in the boundary zones. According to the invention an associated state of the three-phases is not stored and requested for each clock generator instant and instead in the desired sequence the different successive states of the switch position combinations together with the number of associated clock intervals over which the particular switch position combination is to be maintained are stored and requested. Thus, the microprocessor only has to operate at the time of a switch position combination change, by requesting the new combination with the associated clock number, bringing about the change to the switch position combination and setting a counter, which then counts up to the given end point timed by the clock generator. At the end of the number of clock intervals the microprocessor is required by an interrupt to request the next switch position combination together with the associated clock number and so on. During the maintaining of a switch position combination and the counting of the counter over the given clock numbers, the processor is free to carry out other functions, such as establishing and supplying the frequency or current via a display, the complete monitoring of power and control electronics as regards temperature and the like, etc.

Thus, with the construction according to the invention, it is e.g. possible with a desired relatively high resolution to provide one time frame per cycle of the output voltage of approximately 250 and in a specific case 252 clock intervals and thereby ensure within said time frame a sign-rated, pulsed output voltage which, even at low speeds is sufficiently accurately adapted to the desired sinusoidal configuration that the harmonics content is reduced and the desired concentricity and noise reduction are achieved, without having to provide excessive centrifugal masses in the driven motor. The inventive method provides a simple possibility for modifying the duration and number of clock intervals of a cycle. Thus, a device is provided which, on changing the output frequency of the inverter and as a function thereof, polls a given order of different sequences of switch position combinations and associated clock numbers from the memory. Thus, the number of sign-rated pulses per half-cycle can be optimized as a function of the frequency or the speed of the connected motor, so that on the one hand concentricity and low noise are ensured and on the other between the changing of the position combination of the electronic switches in the aforementioned procedure the microprocessor has sufficient time to perform the other functions. Control e.g. takes place during the starting of the motor and increasing the frequency or speed, so that initially a square wave-voltage pattern with a plurality of equalizing pulses to a central square-wave voltage pulse is requested and in the aforementioned manner the electronic switch positions are modified. On increasing the frequency, initially the clock number per time unit is increased, the duration of the individual pulses is increased and their "spacing" in a half-cycle is reduced. If the time between the interrupts initiated by the counter is too short, i.e. the microprocessor must too rapidly request and carry out new switch position combinations, so that it cannot fulfill its other aforementioned functions, then whilst maintaining to the greatest possible extent the sine rating, there is a transfer to a sequence of switch position combinations with a lower number of "longer lasting" equalizing pulses (and correspondingly longer intervals), this causing no problem with respect to the concentricity and noise behaviour, because the frequency is high enough to ensure that the reduction of the equalizing pulses has no disadvantageous effect. This sequence of increasing the clock number per time unit and switching over between different sequences of switch position combinations with square-wave voltage of different equalizing pulse numbers per half-cycle, i.e. different resolution patterns of the desired sine configuration over varyingly high resolutions is then continued up to the desired or maximum speed. Thus, generally it is possible without difficulty to provide a three-phase rotary field of approximately 3 to 100 Hz. The present construction also permits in individual cases a medium frequency application to spindle drives with a frequency up to approximately 500 Hz.

Whilst a particular switch position combination and the associated clock number over which the switch position combination is maintained can be stored and polled in a memory, such as an ROM, EPROM, etc. at different memory locations, which can be optionally sequentially read out in succession, i.e. in two words, according to a preferred embodiment of the invention both one switch position combination and also the associated clock number is stored in a single word (byte) and therefore at a single memory location of the memory. This is possible without difficulty for the aforementioned values. In the case of a three-phase rotary field, it is e.g. necessary to have six electronic switches, namely two in each branch, which are switched in a complementary manner, i.e. if one switch is open the other is closed. Thus, the two switch positions must be coded by three switches, so that three bits of an 8 bit word are to be reserved for the switch position. The remaining 5 bits permits the coding of 32 clock cycles, which is sufficient for maintaining a switch position combination. This leads to a further memory economy of the inventive method. Whereas e.g. in the case of individual storage of the switch position combination to a clock number of approximately 500 per cycle, a corresponding number of memory locations is required, this is significantly reduced in the inventive method. Thus, in the case of e.g. two equalizing pulses, only roughly 30 memory locations are required, which leads to a reduction by a factor of 16.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1A:
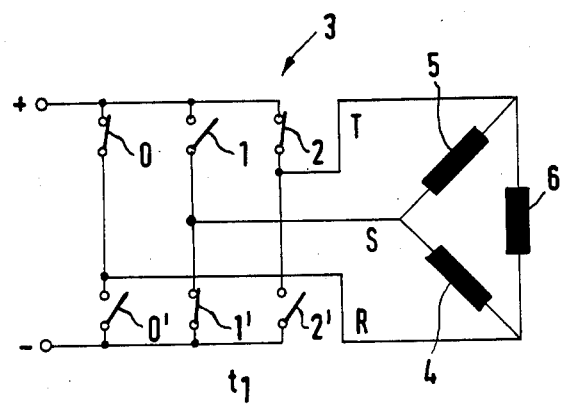
FIG. 1 a diagrammatic equivalent circuit diagram of a three-phase current inverter controlled by means of the inventive process together with the load (motor winding), (a) as from time $t_1$, (b) as from time $t_2$ in FIG. 3.
Figure 1B:
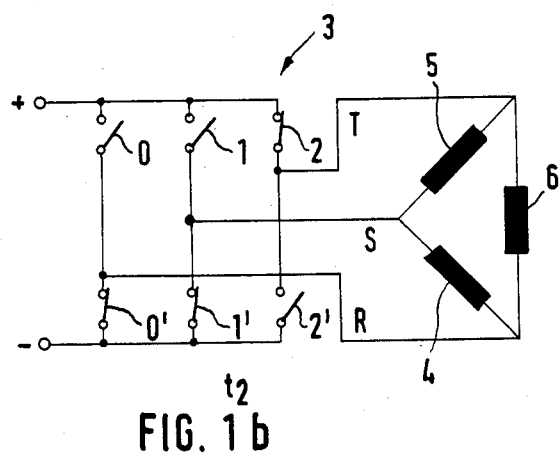

FIG. 1 shows a diagrammatic equivalent circuit diagram for a three-phase current inverter having the three outputs T,S,R with which, in the represented embodiment, is linked the three-conductor winding 4, 5, 6 of the stator or rotor in a delta circuit.

Figure 3:
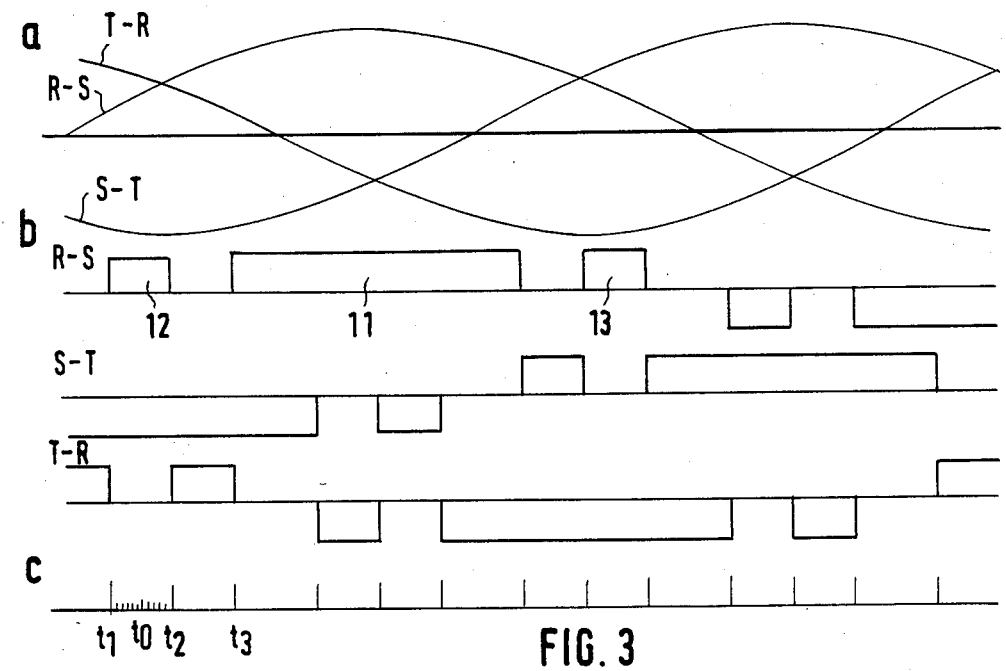
FIG. 3, a simple process sequence showing (a) the ideal sine-waves at the individual load resistors, (b) the sine-rated pulsed output voltage for the branches with a main pulse of two equalizing pulses shown purely qualitatively (c) the times of switching over the switch position combiations.

In order that the motor runs quietly and uniformly, it must ideally be subject to the sine-wave voltage according to FIG. 3 displaced by in each case 120°. This more particularly applies when running slowly, i.e. at low frequencies, whereas when running fast as a result of the masses of the motor and the resulting inertia, variations in the voltage or current from the sinusoidal shape have less influence on the concentricity of the motor with rising frequency. Inverter 3 according to the invention applies square-wave pulses to branches R-S, S-T, T-R.

Inverter 3 is part of a static frequency changer having a rectifier connectable to the alternating current supply network and at least one direct current intermediate circuit arranged between the same and the inverter of FIG. 1 and preferably with a sliding intermediate circuit voltage, whose outputs are designated as the + and − input in FIG. 1. The + and − inputs of the inverter are connected in known manner by connecting lines provided with electronic switches 0, 0' or 1, 1' or 2, 2' and between in each case one pair of switches branch of the p output lines R, S, T of the inverter, which are lead to the load, in this case the three-phase motor. The represented switches 0, 0', etc. are electronic switches in the form of transistors. The switching procedure is such that in each case one switch of a pair of switches is opened when the other is closed and only at the switch over time are both briefly open. If e.g. switches 0 and 2 are closed (and therefore 0' and 2' open), whilst switch 1 is open (and therefore 1' closed), in accordance with the switch combination occurring at time $t_1$ in FIG. 1, then positive voltage is applied across R-S, negative voltage across S-T and no voltage across T-R.

The switch position combination of FIG. 1 is e.g. switched on at time $T_1$ (FIG. 3); whilst simultaneously predetermining the number of clock cycles produced by a clock generator and over which said switch combination state is to be maintained. In the represented embodiment, there e.g. 12 clock intervals, indicated in FIG. 3c. At time $t_2$, a switch combination in the represented embodiment for the same number of clock intervals is set, where there is no voltage drop across R-S, a negative voltage across S-T and a positive voltage across T-R, so that correspondingly switches 0 and 1 are open (and the complementary switches closed) and switch 2 is closed (and therefore 2' open). This switch combination state is maintained over the same number of clock intervals and at time $t_3$ Switch 0 is opened again i.e. the switch position combination of FIG. 1 is restored, but on this occasion for a larger number of clock intervals, in the represented embodiment 16 intervals etc. It is important in the inventive process that a specific given, stored switch position combination is not individually requested or polled at each clock time and instead only at the times at which the switch position combinations change $t_1$, $t_2$, $t_3$, etc. in FIG. 3, are the corresponding new switch position combinations requested together with the number of the desired clock intervals over which they are to be maintained and the latter takes place by merely counting the given clock intervals. Then, in a corresponding manner, a further switch position combination, together with the number of clock intervals over which it is to be maintained, is requested, set and correspondingly counted.

Whereas in the simplified embodiment shown each half-wave is approximated by a rectangular main pulse 11 and two equalizing pulses 12, 13 it is, as already stated, possible to represent the half-wave by only one square-wave pulse of suitable width, particularly in the case of relatively high frequencies. At a low frequency, it is appropriate and easily possible to choose a representation in which more than two equalizing pulses, i.e.

Figure 2:
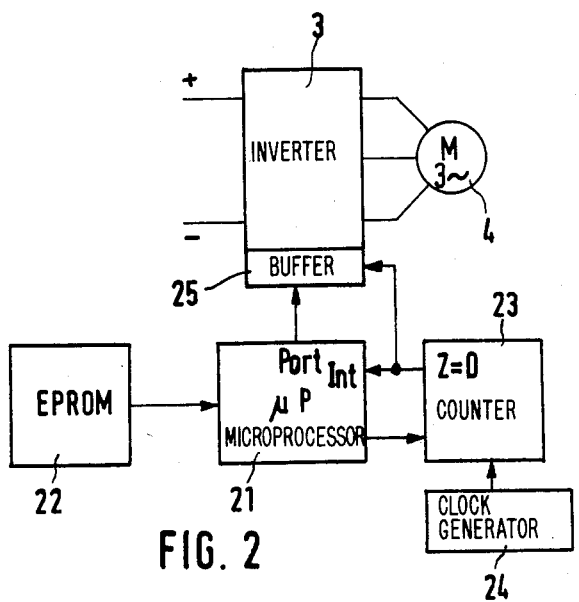
FIG. 2, a block circuit diagram of the essential parts of the apparatus according to the invention.

4,6, etc. are associated with each square-wave main pulse. This more particularly applies with low frequencies, so as to approximate to the maximum possible extent by square-wave pulses the ideal sinusoidal shape and largely reduce disturbing harmonics (caused by the approximation by square-wave pulses). An important aspect of the invention is that at lower frequencies each sinusoidal half-wave is represented by a main pulse and several equalizing pulses, corresponding to 12, 13 associated therewith, whilst in particular at suitable frequencies passing from a representation with a specific number of equalizing pulses to another representation with a different number of equalizing pulses, whereby at a given time the number of equalizing pulses is increased by 2 (if the frequency is reduced) or decreased by 2 (if the frequency is increased). The requesting of different switch combinations and the clock intervals over which they have to be maintained, the switching of the electronic switches (transistors) and the setting of a counter preferably take place by means of a microprocessor. A block circuit diagram for a corresponding apparatus for performing the inventive process is shown in FIG. 2, where 3 is the inverter and 4 the three-phase motor. There is also microprocessor 21, a memory in the form of a eprom 22, a counter 23 and a clock generator 24. In the represented embodiment clock generator 24 for counter 23 comprises a variable frequency oscillator, such as a VCO, which permits a continuous frequency change. The microprocessor sets the counter which corresponding to the clock intervals of clock generator 24, either counts down from a set number to zero or counts up to a predetermined number. It would also be possible to provide a clock generator comprising a high frequency oscillator (crystal oscillator) and e.g. reversible, digital dividers.

Fundamentally, the switch position combinations and the number of clock intervals over which they are maintained can be stored in conventional, known manner in the memory (EPROM). However, preferably, both the switch position combination and the associated clock number are combined in one word (byte) and therefore only occupy one memory location. The switch position combination requires three bits of a byte in the case of a three-phase current for giving the position of switches 0, 1, and 2, because switches 0', 1' and 2' have a complementary position to switches 0, 1, and 2. The remaining 5 bits can be used for indicating and storing the duration of the switch position or the clock interval number over which the specific switch position is maintained, so that a maximum of 32 clock intervals can be given, which is generally completely adequate. Optionally, the same switch combinations can be contained in two successive memories, if the clock interval number 32 is exceeded.

If the external clock counter 24 is at zero, as a result of an interrupt, a switch position combination instruction at the microprocessor port is transferred into a buffer 25 of the inverter and simultaneously the counter 23 is set at the associated clock value. The instruction passed into buffer 25 is consequently at inverter 3 and determines the actual switch positions of the inverter for its duration determined by the set clock value. Microprocessor 21 can then call up a further combination with the clock number from the EPROM 22, whilst checking whether a switch combination counter giving the "position" of the switch position combination within a cycle of the inverter is at zero. If this is the case, a new cycle starts, the switch combination counter is set to the value corresponding to the number of different combinations within the cycle and a "pointer" is set on the first byte of the corresponding cycle or the address counter. In any case, the requested byte is separated into switch combination and clock interval number and the switch combination is supplied at the port. The switch combination counter is decremented and the pointer for the following byte to be requested, the running of the cycle or the address register is incremented. The microprocessor can then perform other functions and returns to the main program until a further interrupt through the counter 24 reaching zero leads to the repeat of the above process.

The same clock number, in a preferred practical example 252, is always necessary for a cycle in order to be able to complete it. For each sample, the voltage time face is the same independently of the number of equalizing pulses, so that on changing from one pattern to another at a given time no system-conditional voltage jumps occur on accelerating or decelerating the motor. The microprocessor ensures precise switching over at given times within the cycle. In the free time between the requesting of the switch position combination from the EPROM, i.e. in the time during which the counter counts during a set combination, it is possible for the microprocessor to fulfill other functions, such as controlling the readout of interesting data, such as frequency, current strength and the like by means of a display, temperature monitoring and monitoring of the control signals for minimum and maximum levels. It can also be used for desired - actual speed monitoring, e.g. if the motor jams due to a overload.

What is claimed is:

1. An inversion process, particularly as part of a frequency change in an output voltage for regulating a three-phase motor during changes in the rpm of the motor such as duration motor starting, in which square-wave voltage pulses are produced by opening and closing electronic switches, wherein repeatedly and in a desired order give combinations of switch positions and an associated number of clock intervals of unchanged switch positions are requested, the switch position combination set and the corresponding number of clock intervals is counted without changing the switch position, and wherein the duration and number of switch position combinations during a cycle of the output voltage is varied as a function of the desired rpm of the motor to change the frequency of the output voltage for said motor.

2. A process according to claim 1, wherein the duration and a number of square-wave voltage pulses is varied as a function of a set output frequency of said output voltage.

3. A process according to claim 1, wherein the switch position combinations and their associated clock interval number are coded and requested as 8 bit words (one byte).

4. An inversion apparatus, particularly as part of an output voltage frequency changer, with several electronic switches, for supplying voltages to a three-phase motor, wherein are provided an electronic memory, in which on the one hand are stored specific combinations of switch positions and on the other numbers of clock intervals respectively associated therewith and belonging thereto over which the corresponding switch position combination is to be maintained, as well as a counter and a device for requesting or polling switch position combinations and the associated number of clock intervals from the memory, for adjusting the combination of switches and for setting the counter, and wherein means are provided which, on changing the frequency of the output voltage to the motor as during starting of the motor and as a function of the desired rpm of the motor, requires a given order of different sequences of switch position combinations and associated clock interval numbers from the memory.

5. An apparatus according to claim 4, wherein the switch position combinations and the associated clock interval numbers are stored in two successive memory locations of the memory.

6. An apparatus according to claim 4, wherein the switch position combinations and their associated clock interval numbers are each stored in the form of a word at one storage location of the memory.

7. An apparatus according to one of the claim 4, wherein the memory is an EPROM.

* * * * *